(12) United States Patent
Park

(10) Patent No.: US 7,667,800 B2
(45) Date of Patent: Feb. 23, 2010

(54) LIQUID CRYSTAL DISPLAY DEVICE AND METHOD OF FABRICATING THE SAME

(75) Inventor: Jae-Deok Park, Gyeongsangbuk-do (KR)

(73) Assignee: LG. Display Co., Ltd., Seoul (KR)

( * ) Notice: Subject to any disclaimer, the term of this patent is extended or adjusted under 35 U.S.C. 154(b) by 183 days.

(21) Appl. No.: 11/880,731

(22) Filed: Jul. 23, 2007

(65) Prior Publication Data
US 2007/0263142 A1    Nov. 15, 2007

Related U.S. Application Data

(62) Division of application No. 10/813,797, filed on Mar. 30, 2004, now Pat. No. 7,248,316.

(30) Foreign Application Priority Data
Jun. 10, 2003    (KR) ...................... 10-2003-0036990

(51) Int. Cl.
G02F 1/1335    (2006.01)
(52) U.S. Cl. ...................... 349/114; 349/143
(58) Field of Classification Search .......... 349/113–114
See application file for complete search history.

(56) References Cited

U.S. PATENT DOCUMENTS

| 6,522,377 | B2 * | 2/2003 | Kim et al. | 349/114 |
| 6,909,479 | B2 * | 6/2005 | Iijima | 349/109 |
| 6,919,945 | B2 * | 7/2005 | Ha | 349/114 |
| 7,248,316 | B2 * | 7/2007 | Park | 349/114 |

\* cited by examiner

*Primary Examiner*—Dung T. Nguyen
(74) *Attorney, Agent, or Firm*—Brinks Hofer Gilson & Lione

(57) ABSTRACT

A transflective liquid crystal display device includes a first substrate including transmissive and reflective pixels. Gate and data lines on the first substrate cross each other to define a pixel region, with a thin film transistor at each crossing. The transmissive and reflective pixels correspond to respective pixel regions. A first passivation layer covers the thin film transistor and has a transmissive hole in the transmissive pixel. A first reflector is disposed on the first passivation layer in the reflective pixel. A second passivation layer is disposed on the first reflector and in the transmissive hole. A pixel electrode on the second passivation layer is connected to the thin film transistor. A second substrate opposing the first substrate has a color filter layer on an inner surface thereof. The color filter layer contains R, G and B sub color filters, which each correspond to a pixel region.

12 Claims, 6 Drawing Sheets

LIQUID CRYSTAL DISPLAY DEVICE AND METHOD OF FABRICATING THE SAME

The present application is a divisional of U.S. patent application Ser. No. 10/813,797, filed Mar. 30, 2004 now U.S. Pat. No. 7,248,316.

This application claims the benefit of Korean Patent Application No. 2003-36990, filed on Jun. 10, 2003 in Korea, which is hereby incorporated by reference for all purposes as if fully set forth herein.

BACKGROUND OF THE INVENTION

1. Field of the Invention

The present invention relates to a liquid crystal display (LCD) device and more particularly, to a transflective liquid crystal display (LCD) device.

2. Discussion of the Related Art

Flat panel display (FPD) devices that are small, lightweight, and have low power consumption have been a subject of recent research in the advent of the information age. FPD devices may be classified into two types depending on whether the device emits or receives light. One type is a light-emitting type display device that emits light to display images, and the other type is a light-receiving type display device that uses an external light source to display images. Plasma display panels (PDPs), field emission display (FED) devices, and electroluminescent (EL) devices are examples of the light-emitting type display devices. Liquid crystal display (LCD) devices are examples of the light-receiving type display device. Among many kinds of FPD devices, LCD devices are widely used for notebook computers and desktop monitors because of their excellent characteristics of resolution, color display and display quality.

Generally, LCD devices include an upper substrate and a lower substrate facing each other with liquid crystal molecules interposed therebetween. Each substrate has an electrode on the inner surface thereof. An electric field is generated by applying a voltage to the electrodes, thereby driving the liquid crystal molecules to display images in accordance with the light transmittance.

Since LCD devices do not emit light, an additional light source is necessary. Accordingly, LCD devices display images by disposing a backlight at a backside thereof and transmitting light from the backlight. Here, electric field-generating electrodes of the LCD devices are made of a transparent conductive material and the two substrates are transparent. This kind of LCD device is referred to as a transmission type LCD device or a transmissive LCD device. Even though a transmissive LCD device can display bright images under a dark environment due to an artificial light source such as a backlight, the transmissive LCD device has a disadvantage of high power consumption due to the backlight.

To remedy this disadvantage, a reflective (or reflection type) LCD device is suggested. The reflective LCD device displays images by reflecting external natural or artificial light, thereby having a low power consumption compared with the transmissive LCD device. In the reflective LCD device, a lower electric field-generating electrode is made of a conductive material having high reflectance and an upper electric field-generating electrode is made of a transparent conductive material so that external light can be transmitted through the upper electric field-generating electrode.

The reflective LCD device has much lower power consumption than the transmissive LCD device. However, the reflective LCD device cannot be used in dark places because it depends on an external light source.

Therefore, a transflective LCD device, which can be used both in a transmissive mode and in a reflective mode, has been recently proposed. A transflective LCD device of the related art will be described hereinafter more in detail.

FIG. 1 is a plan view of an array substrate for a transflective LCD device according to the related art.

In a transflective LCD device 1 of FIG. 1, a plurality of gate lines 3 is horizontally extended and a plurality of data lines 20 is vertically formed in the context of the figure. The gate and data lines 3 and 20 cross each other to define a pixel P. A thin film transistor T, which includes a gate electrode, a semiconductor layer, a source electrode and a drain electrode, is formed at each crossing of the gate and data lines 3 and 20.

In the pixel P, a transmissive area TA in the middle of the pixel P and a reflective area RA around the transmissive area TA are defined. To improve brightness and color properties of the transmissive and reflective modes, a transmissive hole TH is formed to create the transmissive area TA, so that cell gaps may be different in the transmissive area TA and the reflective area RA.

FIG. 2 is a cross-sectional view along the line II-II of FIG. 1. As shown in FIG. 2, a gate electrode 6 is formed on a transparent substrate 1 and a gate insulating layer 10 is formed on the gate electrode 6. A gate line (not shown) connected to the gate electrode 6 is formed under the gate insulating layer 10. An active layer 13 and an ohmic contact layer 16a and 16b are sequentially formed on the gate insulating layer 10 over the gate electrode 6. A source electrode 23 and a drain electrode 26 are formed on the ohmic contact layer 16a and 16b. The source and drain electrodes 23 and 26 with the gate electrode 6 form a thin film transistor T. A data line 20 made of the source and drain electrodes 23 and 26 is formed on the gate insulating layer 10. Although not shown in the figure, the data line 20 is connected to the source electrode 23. The data line 20 crosses the gate line to define a pixel region SP.

A first passivation layer 30 is formed on the thin film transistor T and the data line 20. The first passivation layer 30 is made of an organic material having relatively low dielectric constant. The first passivation layer 30 is removed in the transmissive area TA to create the transmissive hole TH, and remains in a reflective area RA.

A reflector 40 is formed on the first passivation layer 30 in the reflective area RA. The reflector 40 is made of a metallic material that reflects light well. The reflector 40 has a flat surface. A second passivation layer 45 is formed on the reflector 40 and the gate insulating layer 10 exposed in the transmissive area TA. The second passivation layer 45 is made of an inorganic material. The second passivation layer 45 and the first passivation layer 30 over the drain electrode 26 of the thin film transistor T are etched to form a drain contact hole 55 exposing the drain electrode 26. A pixel electrode 50 is formed on the second passivation layer 45 in the pixel region SP. The pixel electrode 50 is connected to the drain electrode 26 through the drain contact hole 55.

However, glare occurs in the transflective LCD device. This happens when a high-intensity external light source is reflected on a liquid crystal display panel. The displayed image is poor due to the glare that occurs as viewed by an observer due to the reflection of light. Therefore, a reflector of an uneven shape is used to increase the brightness along the normal direction and to decrease the glare.

FIG. 3 is a cross-sectional view of another array substrate for a transflective LCD device according to the related art. The array substrate of FIG. 3 has the same structure as that of FIG. 2 except for the reflector. In FIG. 3, the reflector 41 has an uneven surface due to the unevenness of the first passivation layer 30. The uneven surface of the reflector 41 results in diffused reflection of incident light minimizing specular reflection. Accordingly, a brightness along a normal direction of the transflective LCD device in the reflective mode increases by changing a reflection angle of light.

The transflective LCD device including the array substrate of FIG. 3 has good color properties.

Recently, the variety of mobile phones and personal digital assistants (PDAs) using the transflective LCD device have increased, and devices of high resolution are required. An LCD device having a high resolution of about 300 ppi (pixel per inch) includes pixels of about 84 μm×28 μm. Here, both reflective and transmissive areas are defined in each pixel and abut each other. However, the transmissive hole forms a step in the reflective area and the uneven reflector in the reflective area extends to the transmissive area along sidewalls of the transmissive hole. Such an arrangement causes problems in the manufacturing processes, for example, metallization at the edge of the step as well as maintaining unevenness of the reflector thereby obtaining good reflective properties. In addition, since the transmissive hole is small, an alignment layer (not shown) for aligning the liquid crystal molecules in the liquid crystal layer may be poorly rubbed in a rubbing process performed after the alignment layer is provided on pixel electrode in the transmissive and reflective areas. Accordingly, transmissive properties may be lowered.

SUMMARY OF THE INVENTION

Accordingly, the present invention is directed to a transflective liquid crystal display (LCD) device that substantially obviates one or more of the problems due to limitations and disadvantages of the related art.

The present invention provides a transflective liquid crystal display (LCD) device that has high resolution and improved reflective and transmissive properties. In addition, the transflective liquid crystal display (LCD) device reduces manufacturing processes problems.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages, as embodied and broadly described, a transflective liquid crystal display device includes a first substrate including a transmissive pixel and a reflective pixel, a plurality of gate lines and a plurality of data lines on the first substrate, and the gate and data lines crossing each other to define a pixel region. The transmissive pixel and the reflective pixel correspond to respective pixel regions. A thin film transistor is disposed at each crossing of the gate and data lines. A first passivation layer covers the thin film transistor and a transmissive hole is formed in the transmissive pixel. A first reflector is disposed on the first passivation layer in the reflective pixel. A second passivation layer is disposed in the transmissive hole and may or may not be formed on the first reflector. A pixel electrode is formed on the second passivation layer and, if the second passivation layer is formed on the first reflector, may be formed over the first reflector. Either the pixel electrode or the first reflector is connected to the thin film transistor. A second reflector covers the edges of the transmissive hole. A second substrate opposing the first substrate contains a color filter layer. The color filter layer includes R, G and B sub color filters, which each correspond to one of the pixel regions. A liquid crystal layer is disposed between the substrates.

The transmissive and reflective pixels alternate in the direction parallel with the gate lines and/or parallel with the data lines. The transmissive and reflective pixels may be grouped into sets of three transmissive pixels and three reflective pixels that alternate in one of the directions, while alternating between individual transmissive and reflective pixels in the perpendicular direction.

The first and second reflectors are separated by the second passivation layer, at least in an area of the transmissive pixel that is not parallel with the transistor in along a direction parallel with the gate lines. This is to say that in the transmissive pixel, the transmissive hole is formed substantially in a dual-rectangular shape having a larger rectangle and a smaller rectangle. The smaller rectangle is disposed closer to the same gate line bounding the transmissive pixel as the transistor. The smaller rectangle has a width in the direction parallel with the data lines larger than the width of the transistor. The second reflectors covering the edges of the transmissive hole in the larger rectangle are separated from the first reflectors in the direction parallel with the gate lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
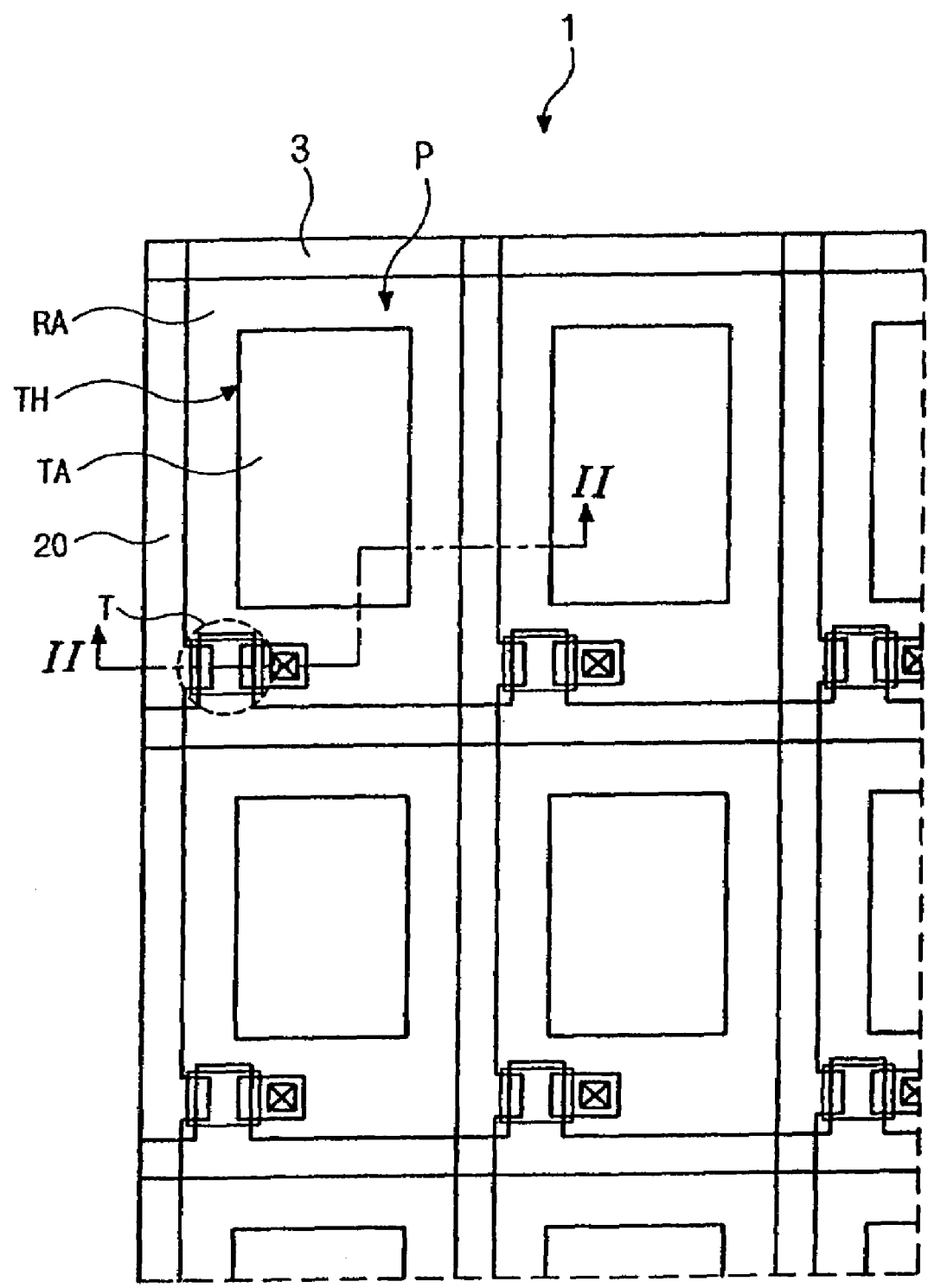
FIG. 1 is a plan view of an array substrate for a transflective LCD device according to the related art.
Figure 2:
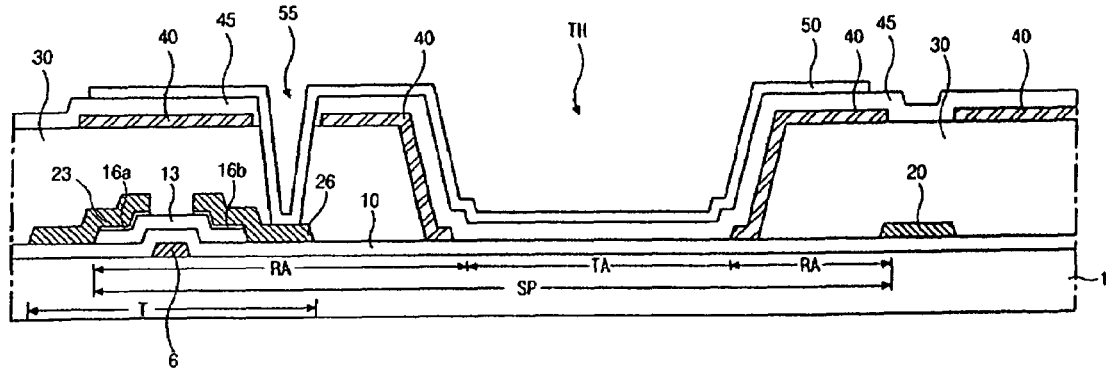
FIG. 2 is a cross-sectional view along the line II-II of FIG. 1.
Figure 3:
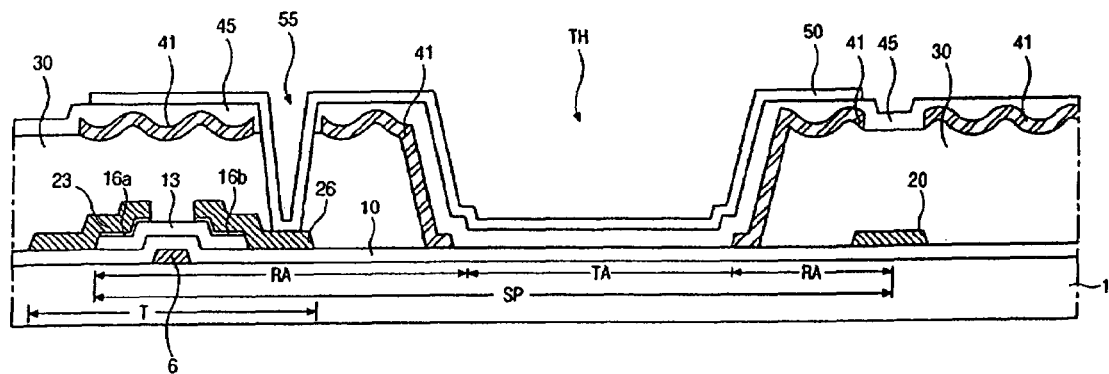
FIG. 3 is a cross-sectional view of another array substrate for a transflective LCD device according to the related art.
Figure 4:
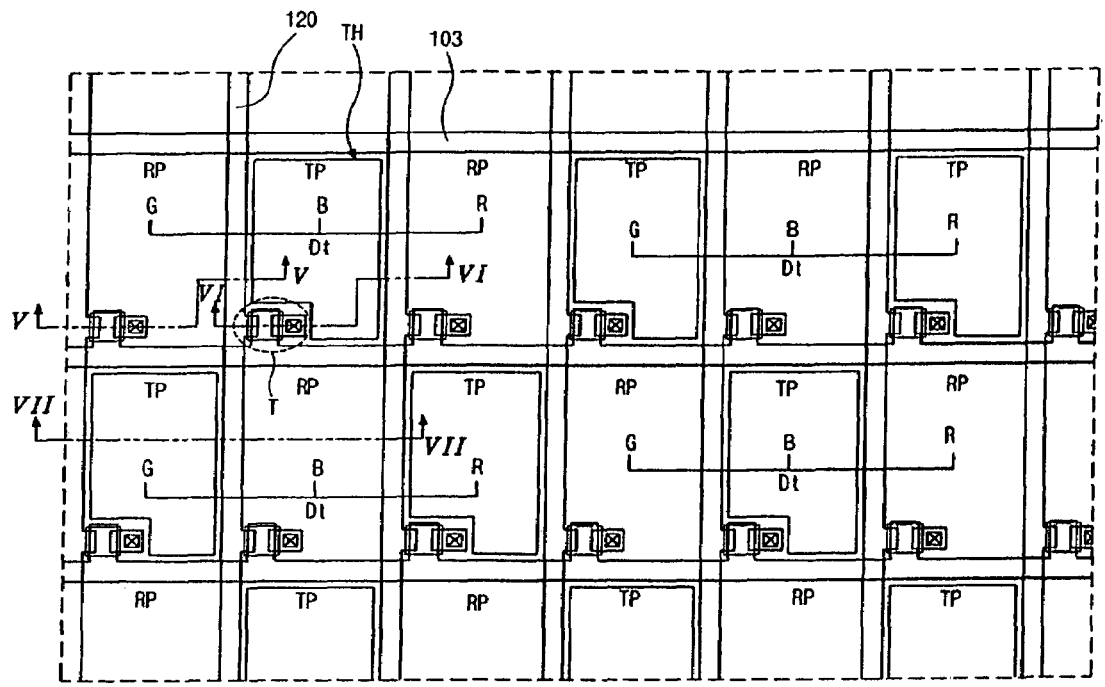
FIG. 4 is a schematic plan view of a transflective liquid crystal display (LCD) device according to a first embodiment of the present invention.

FIG. 4 is a schematic plan view of a transflective liquid crystal display (LCD) device according to a first embodiment of the present invention.

As shown in FIG. 4, a plurality of gate lines 103 is formed horizontally in the context of the figure and is spaced apart from each other. A plurality of data lines 120 is formed vertically in the context of the figure. The gate and data lines 103 and 120 cross each other to define a pixel region. A thin film transistor T is formed at each crossing of the gate and data lines 103 and 120 as a switching element. A color filter layer, which contains red(R), green(G) and blue(B) sub-color filters, is formed at each pixel region, and each sub-color filter corresponds to one pixel region. The pixel region corresponding to one sub-color filter may be referred to as a sub pixel, and three sub pixels of R. G and B may constitute one dot Dt.

In the related art, one sub pixel has both a transmissive area and a reflective area, while the transmissive area and the reflective area correspond to respective sub pixels in the embodiments shown. The respective sub pixels are referred to as a transmissive pixel TP and a reflective pixel RP. The transmissive pixel TP and the reflective pixel RP are alternately arranged. The transmissive pixel TP is disposed between adjacent reflective pixels RP up and down and right and left, and the reflective pixel RP is disposed between adjacent transmissive pixels TP up and down and right and left. In other words, transmissive pixels TP are adjacent to each other diagonally and reflective pixels RP are adjacent to each other diagonally as shown in FIG. 4.

Although not shown in detail, a transmissive hole TH is formed in the transmissive pixel TP. The transmissive hole TH makes a step between the transmissive pixel TP and the reflective pixel RP.

Figure 5:
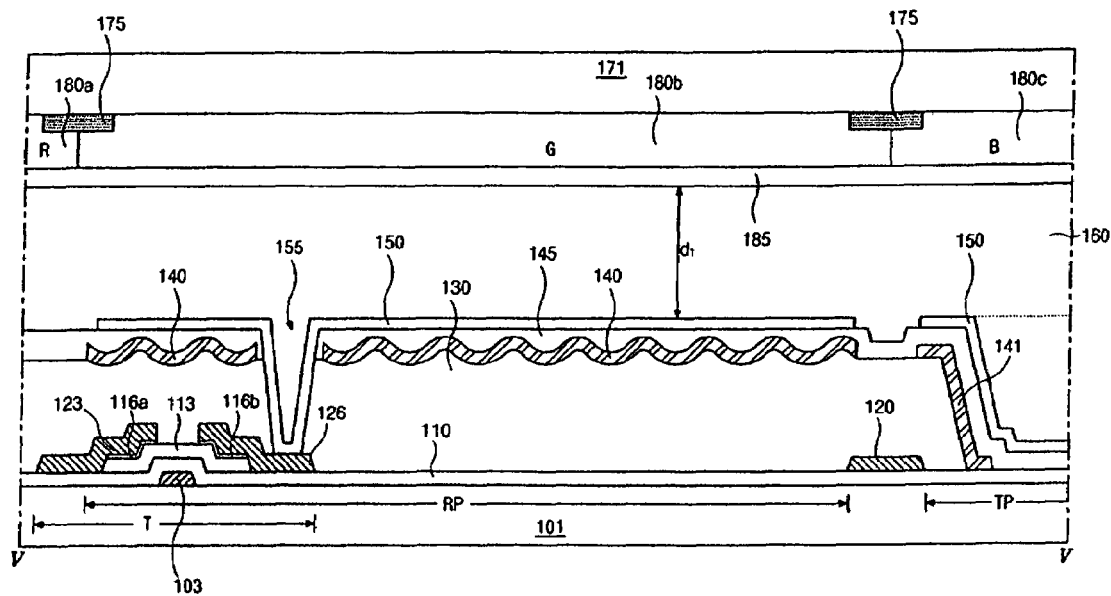
FIG. 5 is a cross-sectional view along the line V-V of FIG. 4.
Figure 6:
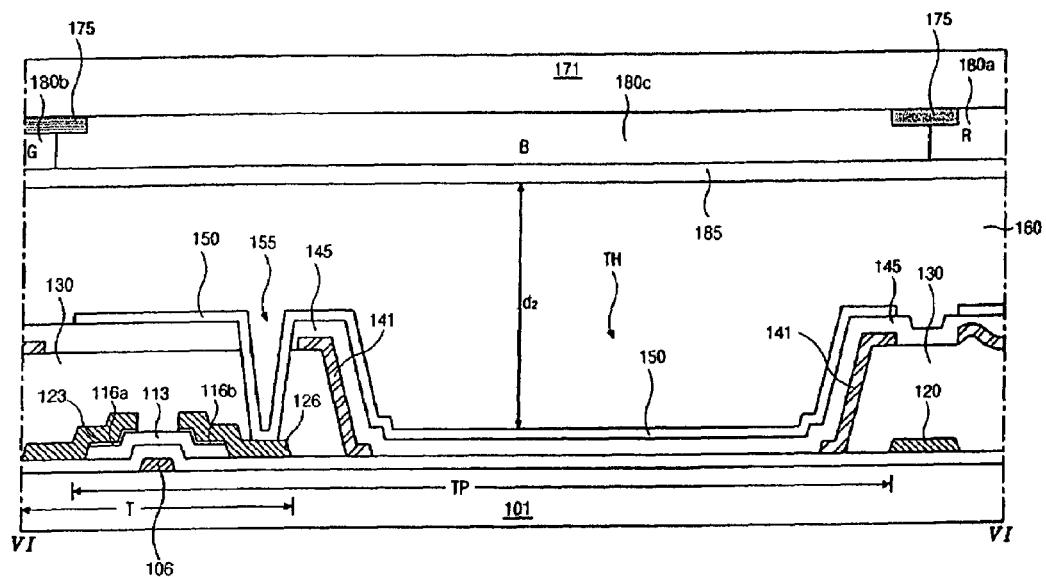
FIG. 6 is a cross-sectional view along the line VI-VI of FIG. 4.
Figure 7:
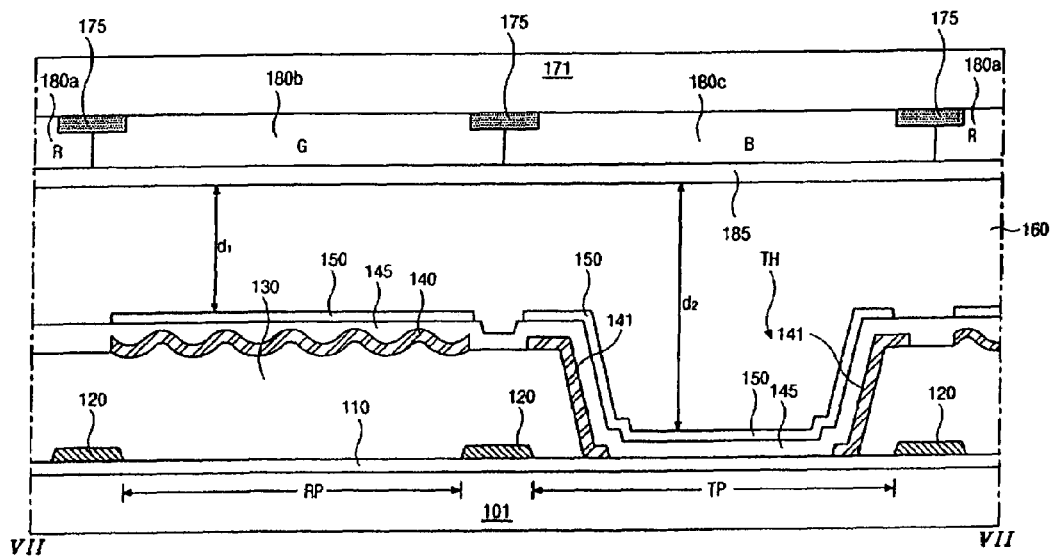
FIG. 7 is a cross-sectional view along the line VII-VII of FIG. 4.

FIGS. 5, 6 and 7 are cross-sectional views of the transflective LCD device according to the first embodiment of the present invention, and correspond to cross-sections along the line V-V, the line VI-VI and the line VII-VII of FIG. 4, respectively. FIG. 5 shows a reflective pixel including a thin film transistor, FIG. 6 shows a transmissive pixel including a thin film transistor, and FIG. 7 shows the middle portion of both the reflective pixel and the transmissive pixel.

In FIGS. 5 to 7, a gate electrode 106 is formed on a first substrate 101 at each pixel RP and TP, and a gate insulating layer 110 is formed on an entire surface of the first substrate 101 including the gate electrode 106 thereon. The gate electrode 106 may be made of a metallic material and the gate insulating layer 110 may be made of an inorganic insulating material. An active layer 113 and an ohmic contact layer 116a and 116b are sequentially formed on the gate insulating layer 110 corresponding to the gate electrode 106. The active layer 113 and the ohmic contact layer 116a and 116b are a semiconductor layer. The active layer 113 may be made of amorphous silicon and the ohmic contact layer 116a and 116b may be made of doped amorphous silicon. A source electrode 123 and a drain electrode 126 are formed on the ohmic contact layer 116a and 116b. The source electrode 123 and the drain electrode 126 are spaced apart over the gate electrode 106. The source electrode 123 and the drain electrode 126 may be made of a metallic material.

The gate electrode 106, the semiconductor layer 113, 116a and 116b, the source electrode 123 and the drain electrode 126 constitute a thin film transistor T.

Additionally, a data line 120 made of the same material as the source and drain electrodes 123 and 126 is formed on the gate insulating layer 110. The data line 120 divides the reflective pixel RP from the transmissive pixel TP. Although not shown, the data line 120 is connected to the source electrode 123.

A first passivation layer 130 is formed on the thin film transistor T and the data line 120. The passivation layer 130 may be made of an organic insulating material such as benzocyclobutene (BCB) or photo acryl. In the reflective pixel RP of FIGS. 5 and 7, the first passivation layer 130 has an uneven surface. In the transmissive pixel TP of FIGS. 6 and 7, the first passivation layer 130 is patterned except for over the thin film transistor T to have a transmissive hole TH. The gate insulating layer 110 is exposed by the transmissive hole TH.

A first reflector 140 and a second reflector 141 are formed on the first passivation layer 130. The first reflector 140 is disposed in the reflective pixel RP and the second reflector 141 is situated in the transmissive pixel TP. The first and second reflectors 140 and 141 may be made of a metallic material that reflects light well such as aluminum or aluminum alloy and may be formed at the same time. The first reflector 140 is uneven due to the first passivation layer 130 having an uneven surface. The unevenness of the first reflector 140 may increase reflective efficiency. The first reflector 140 covers the thin film transistor T, and is removed over a portion of the drain electrode 126. The second reflector 141 is removed in an area corresponding to the transmissive hole TH, and covers the sides of the first passivation layer 130. The second reflector 141 may prevent declination caused by stepping from the transmissive hole TH. The second reflector 141 may also be omitted if desired.

A second passivation layer 145 is formed on an entire surface of the first substrate 101 including the reflectors 140 and 141 by depositing an inorganic material such as silicon nitride ($SiN_x$) or silicon oxide ($SiO_2$) or by coating an organic material such as benzocyclobutene (BCB) or photo acryl. The second passivation layer 145 has a drain contact hole 155 exposing the drain electrode 126 through the first passivation layer 130. The second passivation layer 145 has a flat surface in the reflective pixel RP.

A pixel electrode 150 is formed on the second passivation layer 145 by depositing a transparent conducting material such as indium-tin-oxide (ITO) or indium-zinc-oxide (IZO). The pixel electrode 150 is connected to the drain electrode 126 through the drain contact hole 155.

Here, although the thin film transistor T has a bottom gate structure, the thin film transistor T may have other structure, for example, a top gate structure.

Meanwhile, a second substrate 171 is spaced apart from and faces the first substrate 101. A black matrix 175 is formed on an inner surface of the second substrate 171 (i.e., a surface facing the first substrate). The black matrix 175 corresponds to the gate line (not shown) and the data line 120. A color filter layer of R, G and B sub color filters 180a, 180b and 180c is formed on the black matrix 175. Each sub color filter 180a, 180b and 180c corresponds to each pixel TP and RP. A common electrode 185 is formed on an entire surface of the second substrate 171 including the color filter layer 180a, 180b and 180c. An overcoat layer (not shown) may be further formed between the common electrode 185 and the color filter layer 180a, 180b and 180c.

The black matrix 175 corresponding to the gate line and the data line may be omitted, and the transflective LCD device may have a high aperture ratio.

In this embodiment, the distance between the pixel electrode 150 and the common electrode 185 is defined as a cell gap. Since the transmissive hole TH is formed in the transmissive pixel TP, a cell gap $d_2$ of the transmissive pixel TP is larger than a cell gap $d_1$ of the reflective pixel RP. The cell gap $d_2$ of the transmissive pixel TP, beneficially, may be about twice as wide as the cell gap $d_1$ of the reflective pixel RP.

Figure 8:
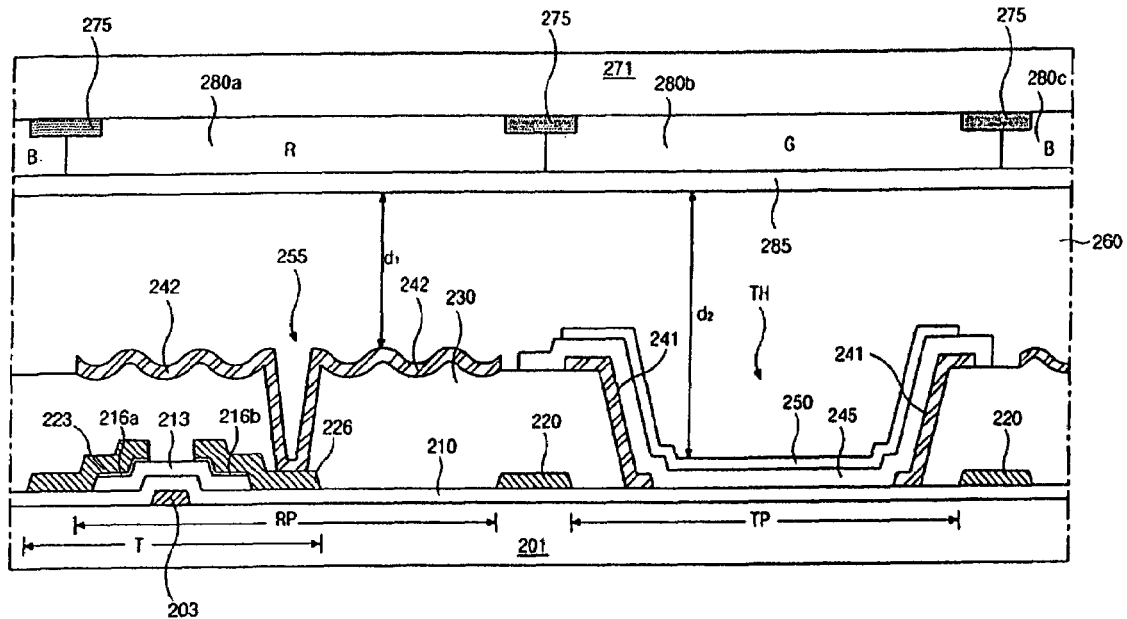
FIG. 8 is a cross-sectional view of another transflective LCD device according to an embodiment of the present invention.

FIG. 8 is a cross-sectional view of another transflective LCD device according to an embodiment of the present invention, and shows both the transmissive pixel and the reflective pixel. The transflective LCD device of FIG. 8 has a structure similar to the transflective LCD device structure of FIGS. 5 to 7. The same references of FIGS. 5 to 7 may be used in FIG. 8 and detailed explanation of the same parts may be omitted.

In this transflective LCD device, a reflector 242 of a reflective pixel RP functions as a reflective electrode, which is connected to a drain electrode 226 of a thin film transistor T, without the pixel electrode.

More particularly, a first passivation layer 230 is formed over the thin film transistor T, which is contains a gate electrode 206, a semiconductor layer 213, 216a and 216b, a source electrode 223 and the drain electrode 226. The first passivation layer 230 has an uneven surface in the reflective pixel RP and includes a transmissive hole TH in the transmissive pixel TP. The transmissive hole TH exposes a gate insulating layer 210. The first passivation layer 230 also has a drain contact hole 255 exposing the drain electrode 226.

A reflective electrode 242 is formed on the first passivation layer 230 in the reflective pixel RP and a reflector 241 is formed on the first passivation layer 230 in the transmissive pixel TP. The reflective electrode 242 and the reflector 241 may be formed by depositing a metallic material such as aluminum or an aluminum alloy that reflects light well and patterning the metallic material. The reflective electrode 242 has unevenness due to the uneven surface of the first passivation layer 230. The reflective electrode 242 is connected to the drain electrode 226 through the drain contact hole 255. Thus, as stated above, the reflective electrode 242 functions as a reflector and a pixel electrode.

The reflector 241 covers the sides of the first passivation layer 230, and is removed in the transmissive hole TH.

A second passivation layer 245 is formed on the first passivation layer 230, the reflector 241 and the exposed gate insulating layer 210. The second passivation layer 245 may be disposed only in the transmissive pixel TP. The second passivation layer 245 may be also formed on the reflective electrode 242 in the reflective pixel RP.

A pixel electrode 250 made of a transparent conductive material is formed on the second passivation layer 245 in the reflective pixel RP. The pixel electrode 250 may overlap a data line 220. Although not shown in the figure, the pixel electrode 250 is connected to another drain electrode through another drain contact hole, which may be formed through the first and second passivation layers 230 and 245.

The reflector 241 prevents light leakage around the transmissive hole TH, and may be omitted. If the reflector 241 is not formed, the second passivation layer 245 in the transmissive pixel TP may be also omitted.

Amorphous silicon is used as the active layer of the thin film transistor T, and research and development into polycrystalline silicon, recently, is ongoing. The field effect mobility of polycrystalline silicon is 100 to 200 times greater than that of amorphous silicon. Additionally, polycrystalline silicon is optically and thermally stable. Polycrystalline silicon is also suited for use in driver integrated circuits (ICs) for driving the display devices, and thus has the advantage that devices can have a compact size because thin film transistors and driver ICs may be formed on the same substrate. Therefore, polycrystalline silicon may be used in small sized display devices such as cellular phones, personal digital assistants (PDAs) and notebook computers.

Figure 9:
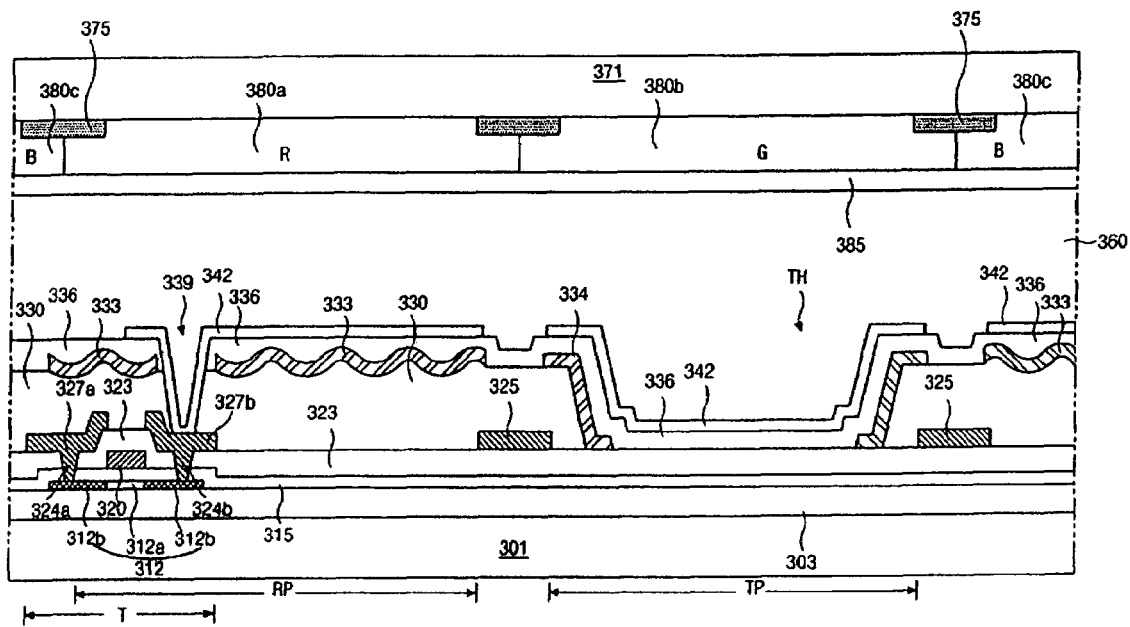
FIG. 9 is a cross-sectional view of another transflective LCD device according to an embodiment of the present invention.

FIG. 9 is a cross-sectional view of another transflective LCD device according to an embodiment of the present invention, and includes polycrystalline silicon as an active layer of a thin film transistor. The transflective LCD device including polycrystalline silicon may have substantially the same plan structure as the transflective LCD device including amorphous silicon. The same references of FIGS. 5 to 7 may be used in the same part of FIG. 9, and detailed explanation of the same parts may be omitted.

In FIG. 9, a buffer layer 303 is formed on an entire surface of a transparent substrate 301. The buffer layer 303 may be made of an inorganic material such as silicon oxide ($SiO_2$). In a reflective pixel RP, a semiconductor layer 312 is formed on the buffer layer 303. The semiconductor layer 312 includes an active area 312a of pure polycrystalline silicon and source/drain areas 312b of doped polycrystalline silicon at both sides of the active area 312a. A gate insulating layer 315 is formed on an entire surface of the substrate 301 including being formed over the semiconductor layer 312. A gate electrode 320 is formed on the gate insulating layer 315 over the active area 312a. An inter insulating layer 323 is formed on the gate electrode 320. Semiconductor layer contact holes 324a and 324b are formed through the inter insulating layer 323 and the gate insulating layer 315 to expose the source/drain areas 312b. A source electrode 327a and a drain electrode 327b are formed on the inter insulating layer 323. The source and drain electrodes 327a and 327b are connected to the source/drain areas 312b through the semiconductor layer contact holes 324a and 324b, respectively. The source and drain electrodes 327a and 327b constitute a thin film transistor T with the gate electrode 323 and the semiconductor layer 312. Although the thin film transistor T is shown only in the reflective pixel RP, the thin film transistor T is also formed in a transflective pixel TP.

In addition, a data line 325 is formed on the inter insulating layer 323. The data line 325 may be formed of the same material as the source and drain electrodes 327a and 327b. The data line 325 divides the reflective pixel RP from the transmissive pixel TP. Although not shown, the data line 325 is connected to the source electrode 327a.

A first passivation layer 330 is formed on the source and drain electrodes 327a and 327b. The first passivation layer 330 has a drain contact hole 339 exposing the drain electrode 327b. The first passivation layer 330 has an uneven surface in the reflective pixel RP and includes a transmissive hole TH in the transmissive pixel TP. The transmissive hole TH exposes the inter insulating layer 323 in the transmissive pixel TP.

A first reflector 333 is formed on the first passivation layer 330 in the reflective pixel RP and a second reflector 334 is formed on the first passivation layer 330 in the transmissive pixel TP. The first and second reflectors 333 and 334 may be formed of a metallic material that reflects light well such as aluminum or aluminum alloy. The first reflector 333 has unevenness due to the uneven surface of the first passivation layer 330. The unevenness of the first reflector 333 increases reflectance. The first reflector 333 covers the thin film transistor T and is removed over a portion of the drain electrode 327b. The second reflector 334 covers the sides of the first passivation layer 330 in the transmissive hole TH.

A second passivation layer 336 is formed on the first and second reflectors 333 and 334. The second passivation layer 336 may be formed by depositing an inorganic material such as silicon nitride or silicon oxide or by coating an organic material such as benzocyclobutene (BCB) or photo acryl. The second passivation layer 336 has a drain contact 339 exposing the drain electrode 327b through the first passivation layer 330. The second passivation layer 336 contacts the inter insulating layer 323 in the transmissive pixel TP.

A pixel electrode 342 is formed on the second passivation layer 336 by depositing a transparent conducting material such as indium-tin-oxide (ITO) or indium-zinc-oxide (IZO). The pixel electrode 342 is connected to the drain electrode 327b through the drain contact hole 339.

Since a color filter substrate including a black matrix 375, a color filter layer 380a, 380b and 380c, and a common electrode 385 has the same structure as the previous examples, detailed explanation for the color filter substrate may be omitted.

In this embodiment including polycrystalline silicon, a reflective electrode may be formed by connecting the first reflector 333 to the drain electrode 327b without the pixel electrode 342 in the reflective pixel RP. At this time, the second passivation layer 336 over the first reflector 333 may be also omitted.

In the above embodiments of present invention, because the reflective area and the transmissive area are formed in respective pixels, the reflective area or the transmissive area increases in each pixel. Thus, although a liquid crystal display device has high resolution of about 300 ppi (pixel per inch) and has smaller pixel areas, problems in manufacturing processes may be overcome.

Figure 10:
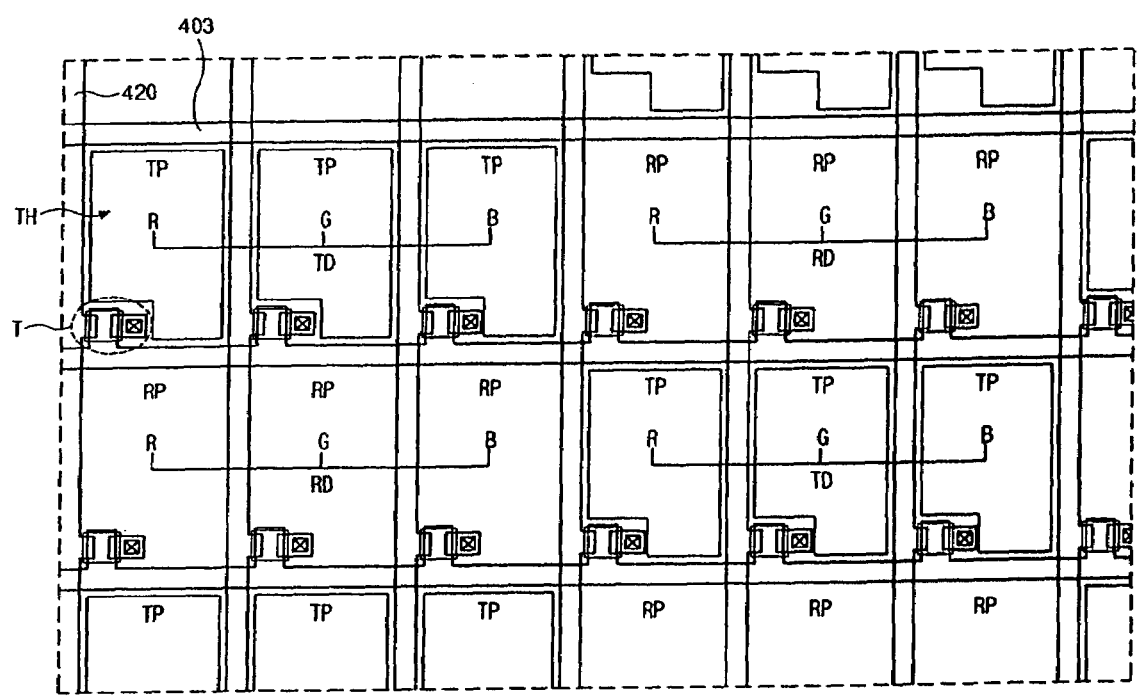
FIG. 10 is a schematic plan view of a transflective liquid crystal display (LCD) device according to a second embodiment of the present invention.

FIG. 10 is a schematic plan view of a transflective liquid crystal display (LCD) device according to a second embodiment of the present invention. In the second embodiment, either three transmissive pixels or three reflective pixels are formed in one dot including sub pixels of R, G and B.

As shown in FIG. 10, a plurality of gate lines 403 is formed horizontally in the context of the figure and is spaced apart from each other. A plurality of data lines 420 is formed vertically in the context of the figure. The gate and data lines 403 and 420 cross each other to define a pixel region. A thin film transistor T is formed at each crossing of the gate and data lines 403 and 420 as a switching element. A color filter layer, which is contains red(R), green(G) and blue(B) sub-color filters, is formed at each pixel region, and each sub-color filter corresponds to one pixel region. The pixel region corresponding to one sub-color filter may be referred to as a sub pixel, which is classified into a transmissive pixel TP and a reflective pixel RP. Three transmissive pixels TP of R, G and B constitute one transmissive dot TD and three reflective pixels RP of R, G and B form one reflective dot RD. Each transmissive pixel TP of the transmissive dot TD includes a transmissive hole (not shown) and each reflective pixel RP of the reflective dot RD has a reflector (not shown). The transmissive hole may be formed in a passivation layer to cause stepping.

The transmissive dot TD and the reflective dot RD may be alternately arranged, and thus the reflective dot RD may be disposed in the upper and lower sides and in the left and right sides of the transmissive dot TD.

Each reflective pixel RP of the reflective dot RD and each transmissive pixel TP of the transmissive dot TD may have the same structures as examples of the first embodiment.

In the transflective LCD device of the embodiments shown of the present invention, since the reflective area and the transflective area are formed respective pixel regions, problems in the manufacturing processes may be reduced. In addition, productivity may be increased according to decreasing badness in the manufacturing processes.

Particularly, arranging problems in a rubbing process may be solved and an uneven reflector may be formed without difficulty, and thus the transflective LCD device may have high resolution and good reflective and transmissive properties.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A transflective liquid crystal display device, comprising:
a first substrate including a transmissive pixel and a reflective pixel;
a plurality of gate lines and a plurality of data lines on the first substrate, the gate and data lines crossing each other to define a pixel region, the transmissive and reflective pixels correspond to respective pixel regions;
a thin film transistor at each crossing of the gate and data lines;
a first passivation layer covering the thin film transistor, the first passivation layer having a transmissive hole in the transmissive pixel;
a first reflector on the first passivation layer in the reflective pixel;
a second passivation layer in the transmissive pixel;
a pixel electrode on the second passivation layer;
a second substrate spaced apart from and facing the first substrate;
a color filter layer on an inner surface of the second substrate, the color filter layer containing red (R), green (G) and blue (B) sub color filters, each sub color filter corresponding to one of the pixel regions;
a liquid crystal layer between the first and second substrates; and
a second reflector between the first and second passivation layers in the transmissive pixel, the second reflector covering sides of the first passivation layer corresponding to the transmissive hole,
wherein three transmissive pixels constitute one transmissive dot, and three reflective pixels constitute one reflective dot, and wherein the one transmissive dot alternately arranged with the one reflective dot.

2. The device according to claim 1, wherein the second reflector overlaps the data lines.

3. A transflective liquid crystal display device, comprising:
a first substrate including a transmissive pixel and a reflective pixel;
a plurality of gate lines and a plurality of data lines on the first substrate, the gate and data lines crossing each other to define a pixel region, the transmissive pixel and the reflective pixel corresponding to respective pixel regions;
a thin film transistor at each crossing of the gate and data lines;
a first passivation layer covering the thin film transistor, the first passivation layer having a transmissive hole in the transmissive pixel;
a reflective electrode on the first passivation layer in the reflective pixel, the reflective electrode connected to the thin film transistor;
a pixel electrode disposed in the transmissive pixel and connected to the thin film transistor;
a second substrate spaced apart from and facing the first substrate;
a color filter layer on an inner surface of the second substrate, the color filter layer containing red (R), green (G) and blue (B) sub color filters, each sub color filter corresponding to one of the pixel regions;
a liquid crystal layer between the first and second substrates; and a second passivation layer disposed in the transmissive pixel on which the pixel electrode is disposed and a reflector between the first and second passivation layers in the transmissive pixel, the reflector covering sides of the first passivation layer corresponding to the transmissive hole, wherein three transmissive pixels constitute one transmissive dot, and three reflective pixels constitute one reflective dot, and wherein the one transmissive dot alternately arranged with the one reflective dot.

4. The device according to claim 3, wherein the reflector overlaps the data lines.

5. A transflective liquid crystal display device, comprising:
opposing first and second substrates;
a liquid crystal layer between the first and second substrates;
transmissive and reflective pixels formed on the first substrate, the transmissive and reflective pixels separated by intersecting gate and data lines and alternating along at least one direction parallel with the gate or data lines;
a color filter layer containing red (R), green (G) and blue (B) sub color filters, each of which corresponds to one of the transmissive and reflective pixels; and
each of the transmissive and reflective pixels containing a thin film transistor covered by a first passivation layer and a first reflector disposed on the first passivation layer over the thin film transistor;
wherein the transmissive pixel contains a second passivation layer on which a pixel electrode is disposed, the first passivation layer contains a hole, and a second reflector that covers sides of the hole is disposed between the first and second passivation layers, and
in each of the transmissive and reflective pixels, the pixel electrode or first reflector is connected to the transistor.

6. The device according to claim 5, wherein, in each of the transmissive and reflective pixels, the second passivation layer is disposed on the first reflector and the pixel electrode, which is disposed over the first reflector, is connected to the transistor.

7. The device according to claim 5, wherein the first passivation layer has an uneven surface and the first reflector formed on the uneven surface of the first passivation layer is uneven.

8. The device according to claim 7, wherein the first passivation layer has an even surface between the first reflector and the second reflector and on which the first reflector is not formed and the second passivation layer covers at least a portion of the even surface.

9. The device according to claim 8, wherein the second passivation layer separates the second reflector from the first reflector.

10. The device according to claim 9, wherein no portion of the first passivation over which the first reflector is formed has an uneven surface.

11. The device according to claim 5, wherein the transmissive hole is formed in an area adjacent to the transistor in a direction parallel with the gate lines.

12. The device according to claim 5, wherein the first reflector is connected to the thin film transistor.

* * * * *